(12) United States Patent
Kahn

(10) Patent No.: US 11,817,102 B2
(45) Date of Patent: Nov. 14, 2023

(54) SYSTEM AND METHOD FOR DIGITAL ASSISTANT USER REMINDERS

(71) Applicant: ARRIS ENTERPRISES LLC, Suwannee, GA (US)

(72) Inventor: Michael Robert Kahn, Cherry Hill, NJ (US)

(73) Assignee: ARRIS Enterprises LLC, Suwanee, GA (US)

( * ) Notice: Subject to any disclaimer, the term of this patent is extended or adjusted under 35 U.S.C. 154(b) by 108 days.

(21) Appl. No.: 17/217,855

(22) Filed: Mar. 30, 2021

(65) Prior Publication Data

US 2021/0312928 A1 Oct. 7, 2021

Related U.S. Application Data

(60) Provisional application No. 63/003,603, filed on Apr. 1, 2020.

(51) Int. Cl.
*G10L 15/32* (2013.01)
*G06F 3/16* (2006.01)
*G10L 15/22* (2006.01)

(52) U.S. Cl.
CPC .............. *G10L 15/32* (2013.01); *G06F 3/167* (2013.01); *G10L 15/22* (2013.01)

(58) Field of Classification Search
CPC ... G10L 15/26; G10L 15/22; G10L 2015/223; G10L 2015/228
See application file for complete search history.

(56) References Cited

U.S. PATENT DOCUMENTS

| | | | |
|---|---|---|---|
| 2006/0287864 A1* | 12/2006 | Pusa ....................... | G10L 15/26 704/E15.045 |
| 2011/0201385 A1* | 8/2011 | Higginbotham ........ | G10L 15/26 455/563 |
| 2017/0092269 A1* | 3/2017 | Haubrich ............. | H04R 25/554 |
| 2017/0245076 A1* | 8/2017 | Kusano .................... | H04R 3/00 |
| 2018/0040319 A1* | 2/2018 | Rotman ............... | G04G 13/026 |
| 2018/0211656 A1* | 7/2018 | Chong .................... | G10L 15/22 |
| 2020/0005777 A1* | 1/2020 | Wittke ................. | G06F 16/9535 |
| 2021/0272570 A1* | 9/2021 | Gupta ................... | G10L 15/222 |

\* cited by examiner

*Primary Examiner* — Mark Villena
(74) *Attorney, Agent, or Firm* — Panitch Schwarze Belisario & Nadel LLP

(57) ABSTRACT

A system and method for the management of digital assistants enabling the generation and issuance of audible user reminders in response to previous digital assistant requests issued by the user. In particular, the issued reminder is related to the operation or state of a particular system or device controlled or otherwise impacted as a consequence of the user's previous digital assistant request. Such reminders are issued after a predetermined time has elapsed after the issuance of the digital assistant request. The reminders can be persistent until the system receives an acknowledgement from the user or feedback that the state or operation of the particular impacted system or device has been altered.

22 Claims, 5 Drawing Sheets

SYSTEM AND METHOD FOR DIGITAL ASSISTANT USER REMINDERS

CROSS-REFERENCE TO RELATED APPLICATION

This application claims the benefit of U.S. Provisional Patent Application No. 63/003,603, filed Apr. 1, 2020, which is incorporated by reference herein in its entirety.

BACKGROUND OF THE INVENTION

Since the release of the Amazon Echo in 2014 and the Google Assistant in 2016, the consumer market has seen an ever-increasing proliferation of voice-responsive digital assistants. These assistants have become almost ubiquitous in both home and workplace environments, as both stand-alone appliances and as integral systems within other products, such as televisions, household appliances, thermostats, audio systems and automobiles. It is not uncommon for a work or home environment to contain numerous digital assistants, each of which is a separate system continuously "listening" for voice commands.

The ease with which a user can engage such digital assistants to answer various questions and control numerous household systems and devices has made interfacing with digital assistants quite natural for users. Issuing a command request or posing a question is done without causing an interruption the daily routine or the particular task a given user might be engaged in. While this is the intent of the conversational interface offered by these digital assistants, it can also result in users not recalling that they have issued a particular command to a digital assistant—Having a "conversation" with the digital assistant just isn't a very memorable event; it is an ordinary occurrence that fails to significantly impact the user.

Given that the household systems and devices controlled that can be controlled by digital assistants include many that can have serious repercussions if not properly managed (ovens, heating and air conditioning systems, indoor and outdoor lighting, door locks, etc.). For example, a user might request that a digital assistant turn on and set an oven to a temperature to 400°. If that user then forgot about making this request, became distracted and neglected to turn the oven off, an unsupervised 400° oven could be a safety and fire hazard. Similarly, if a user requested that digital assistant unlock a front door in anticipation of the arrival of a child home, but then forgets to relock the door later in the day (either manually or via a request to a digital assistant). This could represent an unintended security risk. The lack of physical contact with the oven or door lock in the above scenarios only adds to the chance that the issued request to control these devices could be forgotten.

There is a need for a means of enabling, within a given environment serviced by one or more digital assistants, a system providing audible reminders to users as a consequence of previous requests the user issued to a digital assistant.

BRIEF SUMMARY OF THE INVENTION

A system and method for the management of digital assistants enabling the generation and issuance of audible user reminders in response to previous digital assistant requests issued by the user. In particular, the issued reminder is related to the operation or state of a particular system or device controlled or otherwise impacted as a consequence of the user's previous digital assistant request. Such reminders are issued after a predetermined time has elapsed after the issuance of the digital assistant request. The reminders can be persistent until the system receives an acknowledgement from the user or feedback that the state or operation of the particular impacted system or device has been altered.

BRIEF DESCRIPTION OF THE DRAWINGS

The aspects, and advantages of the present invention will become better understood with regard to the following description, appended claims, and accompanying drawings in which:

DETAILED DESCRIPTION

Figure 1:
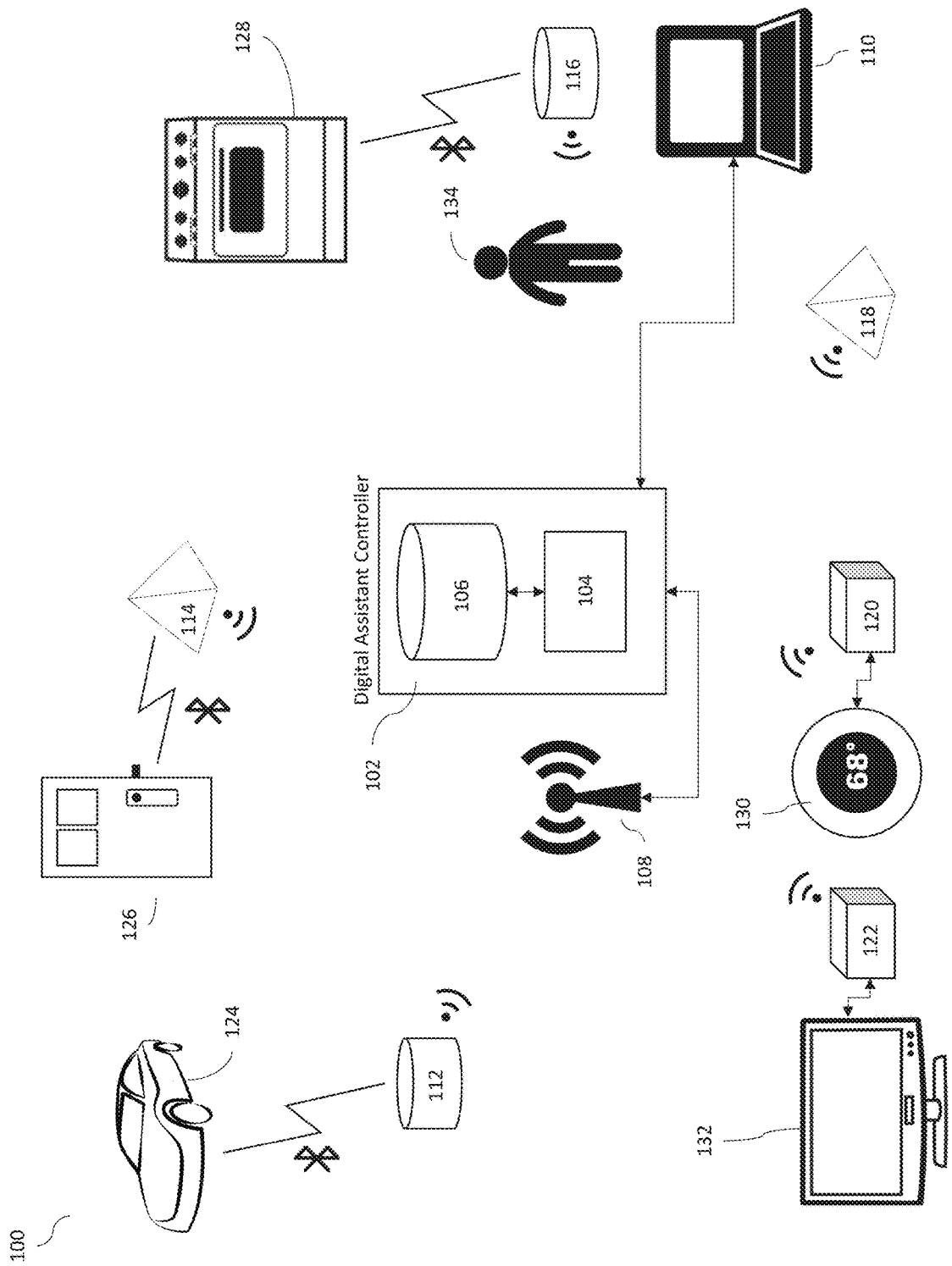
FIG. 1 is a functional diagram of a first preferred embodiment of a digital assistant management system.

FIG. 1 is a functional diagram of a preferred embodiment for a digital assistant management system. As shown, the system 100 includes DAC 102 which serves as the nexus for the system. Controller 102 includes processor 104, and memory 106, wireless interface 108, and graphical user interface 110. This controller may be implemented via a general-purpose personal computer, a dedicated appliance (such as a set-top box or other consumer premises equipment) that are co-located with the digital assistants, or via an off-site device connected to the wireless interface via a private or public network. Controller 102 is shown to be wirelessly connected to six digital assistants (112-122), each of which is programmed to respond to a specific activation phrase.

In addition, particular digital assistants are adapted to interface with and control specific devices or systems. Digital assistant 112 is adapted to interface with and issue commands to automobile 124 via a Bluetooth® connection; digital assistant 114 is adapted to interface with and issue commands to door locking system 126 via a Bluetooth connection; digital assistant 116 is adapted to interface with and issue commands to oven 128 via a Bluetooth connection; digital assistant 120 is integrated into thermostat 130; and digital assistant 122 is integrated into television 132 and adapted to interface and issue commands to that device.

Memory 106 stores information on each of the digital assistants, including device-specific control capabilities of each digital assistant. Table A is a representation of such stored information for the system depicted in FIG. 1:

TABLE A

| Digital Assistant identifier | Device-Specific command & control capability | Initiating command(s) | Reminder Interval |
|---|---|---|---|
| 112 | automobile | start engine | 15 minutes |
| 114 | door lock | unlock | 10 minutes |
| 116 | oven | preheat, bake, broil | 30 minutes |
| 118 | none | none | N/A |

TABLE A-continued

| Digital Assistant identifier | Device-Specific command & control capability | Initiating command(s) | Reminder Interval |
|---|---|---|---|
| 120 | thermostat | disable | 120 minutes |
| 122 | television | on | 90 minutes |

In addition, as shown in Table A, the information stored in memory 106 also includes information indicating the particular device-related command(s) that can initiate the process of generating an audible reminder, whether or not an audible reminder is to be generated, and the amount of time after an initiating command at which a reminder is generated (reminder interval).

The information stored in memory 106 can be acquired by DAC 102 via the wireless connection with each digital assistant, or such information can be entered via graphical user interface 110. Graphical user interface 110 can be a dedicated interface appliance, a personal computer, or a smartphone, and be connected to the DAC via a wired or wireless connection.

Figure 2A:
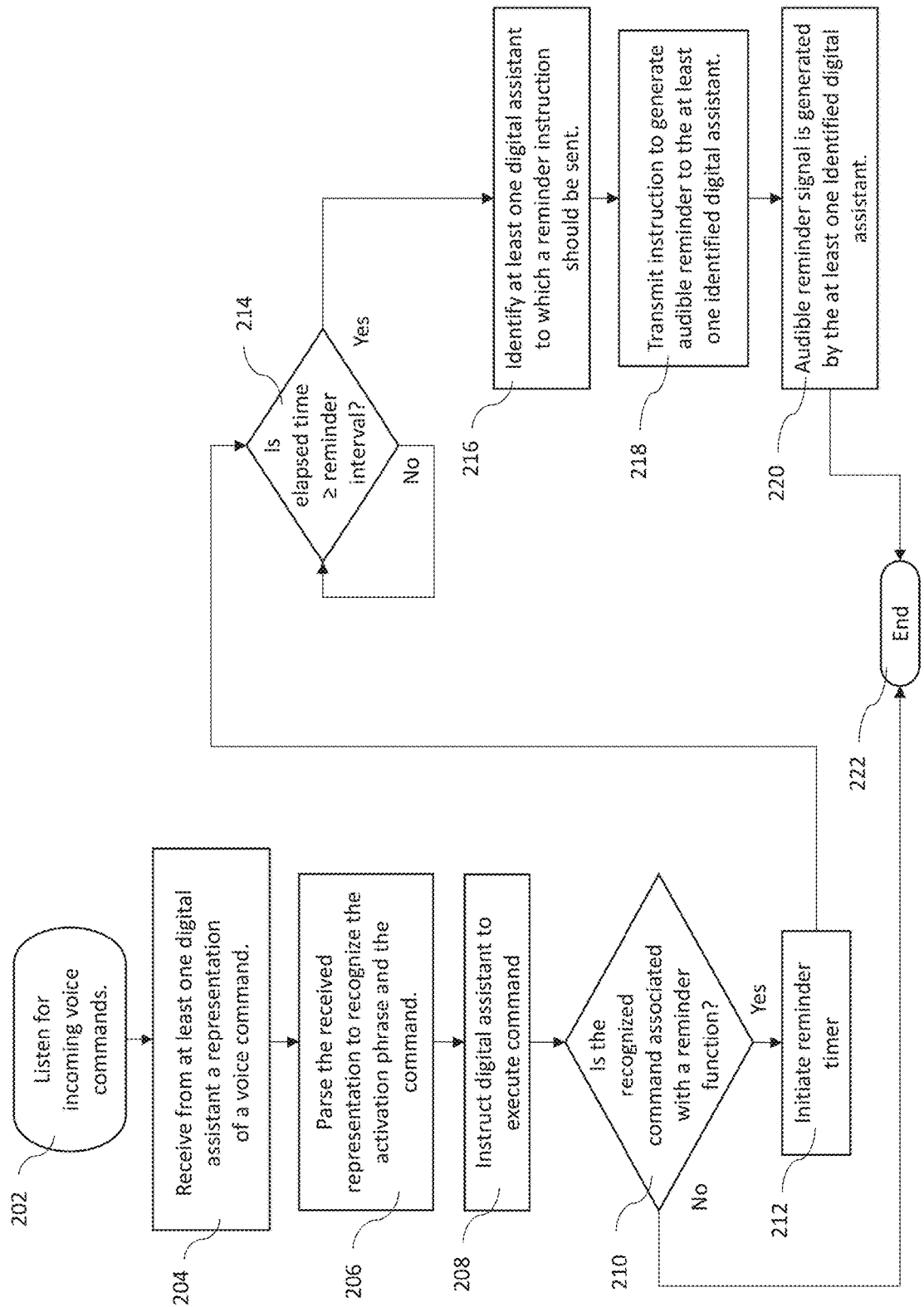
FIG. 2A is a is a flow diagram of a first set of operational steps executed within the system of FIG. 1.

Upon the issuance of a voice command by a user of system 100, the command is received via one or more microphones within the digital assistants, assuming the particular digital assistants are within audible range of the user speaking the command. In this example, a command to "Preheat oven to 375°" spoken by user 134 is received by digital assistant 116. The command is prefaced by the proper activation phrase for digital assistant 116. Upon receiving the vocal command spoken by user 134, digital assistant 116 transmits a representation of the received audio to DAC 102 (steps 202 and 204 of FIG. 2A). As shown in FIG. 2, processor 104 analyzes the received audio to parse and recognize the activation phrase and the command (preheat oven to 375°) (step 206). Such parsing and recognition are well known in the art, and commonly utilized within present digital assistant technologies.

Processor 104 then transmits a "Preheat oven to 375°" command request to digital assistant 116 via wireless interface 108 (step 208). The wireless interface could be any local wireless system, such as a Wi-Fi system based on the IEEE 802.11 standard, and the connection between wireless interface and DAC 102 can be either wired or wireless. Digital assistant 116, upon receiving the command request, responds by transmitting, via Bluetooth, a command to preheat oven 128 to 375°.

Processor 104 then queries memory 106 to determine if a command to preheat an oven has been identified as a command for which a reminder should be generated (step 210). As shown in Table A, preheating an oven is a command that has been identified as such. Consequently, the process continues with step 212. If, however, the requested command was not one that was associated with the generation of a reminder, the reminder process would terminate (step 222).

In step 212, processor 104 initializes a reminder timer, which measures the elapsed time since the requested instruction ("Preheat oven to 375°") was executed. Next, processor 104 determines if the elapsed time, as measured by the reminder timer, is greater than or equal to reminder interval associated with the requested command. As shown in Table A, memory 106 stores a value of 30 minutes for the reminder interval associated with preheating an oven. If the elapsed time is not found to be greater than or equal to the reminder interval, processor 104 continues to periodically check this condition (loop back to step 214). If, However, the elapsed time is found to be greater than or equal to the reminder interval, the process continues with step 216.

In step 216, processor 104 makes a determination as to which digital assistant should be sent a reminder instruction. In the present example, the command to preheat the oven was received from user 134 via digital assistant 116. However, thirty minutes have passed since that command was received, and user 134 might no longer be in the vicinity of digital assistant 116. Instructing digital assistant 116 to generate an audio reminder for user 134 would have little impact if the user was no longer within audible range of that digital assistant. Accordingly, processor 104 is adapted to send the reminder instruction to the digital assistant within system 100 that received the last verbal command. For example, if the most recent vocal command within system 100 had been received by digital assistant 118, processor 104 would send the reminder instruction to digital assistant 118 (step 218). If no other vocal commands had been received by digital assistants within system 100 following the receipt of the "Preheat oven to 375°" command by digital assistant 114, then processor 104 would send the reminder instruction to the digital assistant 114 (step 218).

Although the present example identifies one digital assistant for reception of a reminder instruction, processor 104 can be programmed to transmit the reminder instruction to multiple digital assistants. For example, the reminder instruction could be sent to the digital assistant at which the most recent vocal command was received and to the digital assistant at which the command associated with the reminder was received (digital assistants 118 and 114). Processor 104 could also be programmed to send the reminder instruction to all of the digital assistants within system 100; thereby maximizing the chance that a user would hear a generated reminder. Upon receipt of a reminder instruction from processor 104, a digital assistant (or multiple digital assistants) would respond by generating an audible reminder signal (step 220). This generated signal could be a simple tone, a series off tones, or a synthesized/recorded voice message.

Figure 2B:
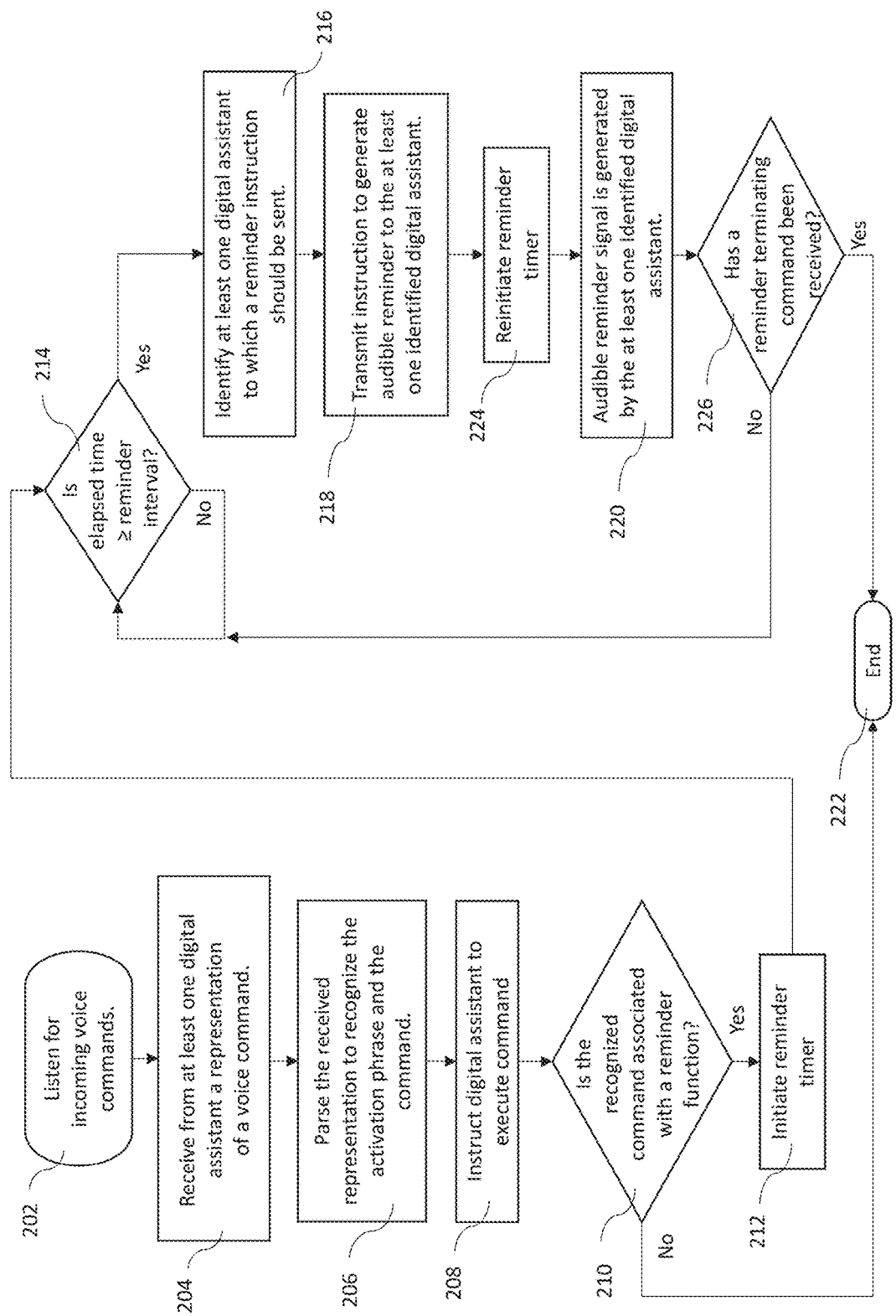
FIG. 2B is a is a flow diagram of a second set of operational steps executed within the system of FIG. 1.

FIG. 2B provides a flow diagram of an alternate set of operational steps that can be executed within the system of FIG. 1. Steps 202 through 222 are similar in operation to the steps described above with respect to FIG. 2A. For the process depicted in FIG. 2B, memory 106 is adapted to store information indicative of a command or commands that will result in the termination of an associated reminder within system 100. For example, as shown in Table B, receipt of a command to turn oven 128 off is associated with a reminder that was initiated by commands to cause oven 128 to preheat, bake or broil.

TABLE B

| Digital Assistant identifier | Device-specific command & control capability | Initiating command(s) | Reminder Interval | Reminder terminating command(s) |
|---|---|---|---|---|
| 112 | automobile | start engine | 15 minutes | engine off |
| 114 | door lock | unlock | 10 minutes | lock |
| 116 | oven | preheat, bake, broil | 30 minutes | oven off |
| 118 | none | none | N/A | N/A |
| 120 | thermostat | disable | 120 minutes | enable |
| 122 | television | on | 90 minutes | off |

Table B also shows reminder terminating commands associated with automobile 124, door locking system 126, thermostat 130 and television 132.

As shown in FIG. 2B, the process continues from step 218, with processor 104 reinitiating the reminder timer (starting the timer from time zero) (step 224) and determining if a terminating command (associated with an active reminder) has been received by DAC 102 (step 226). If such a terminating command has been received ("turn off oven" in the case of the example described above), the reminder process terminates with step 222. If processor 104 makes the determination that a signal indicative of a terminating command has not yet been received by DAC 102 (step 226), the process continues with step 214. As shown, if processor 104 determines that the reinitiated reminder interval has elapsed, an additional reminder instruction is transmitted to at least one identified digital assistant (steps 216 and 218), and an audible signal is generated (step 220).

Figure 2C:
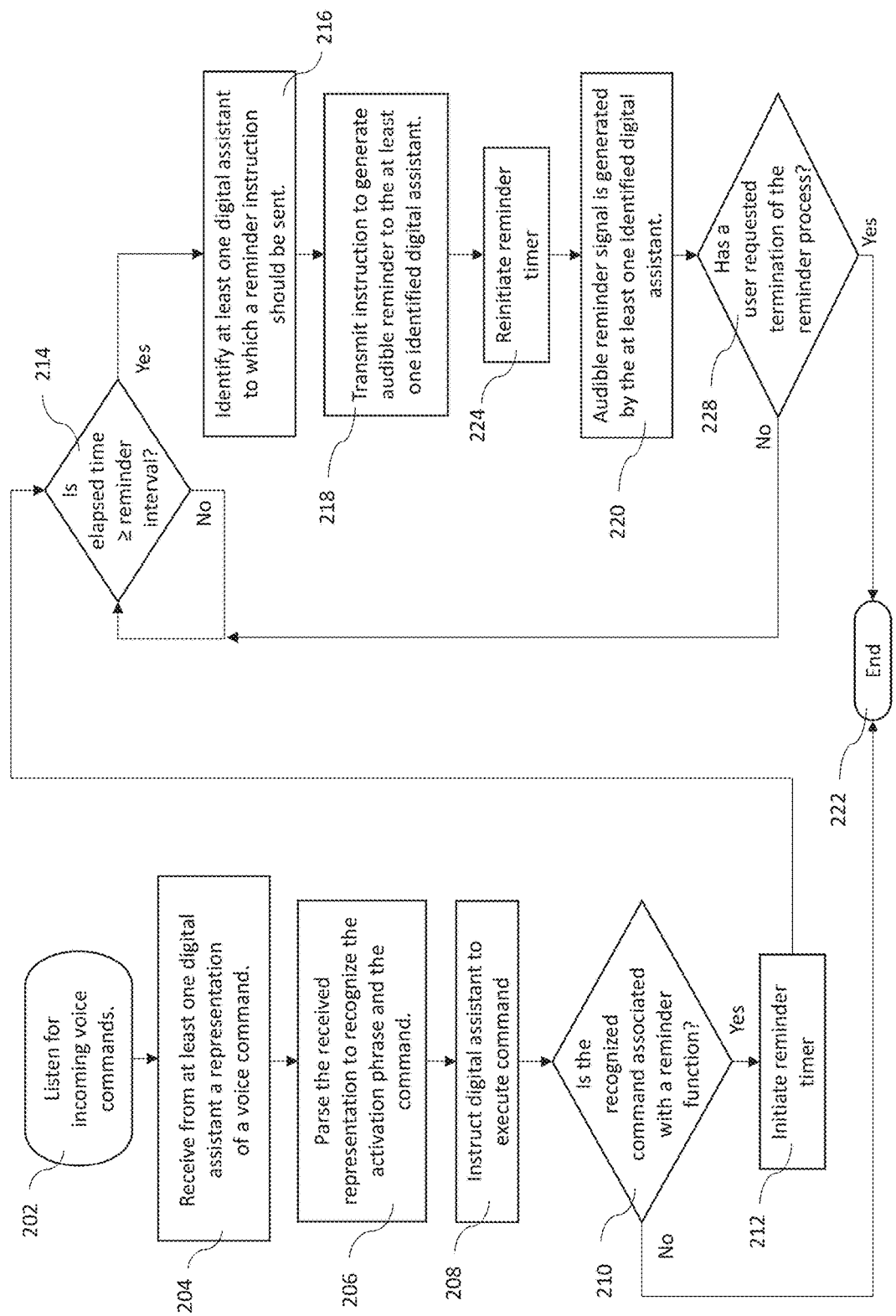
FIG. 2C is a is a flow diagram of a third set of operational steps executed within the system of FIG. 1.

The flow diagram for yet an additional set of alternative operational steps that can be executed within the system of FIG. 1 is provided in FIG. 2C. Steps 202 through 224 are similar in operation to the steps described above with respect to FIG. 2B. However, following the generation of an audible reminder signal (step 220), processor 104 determines if a user has proactively requested that the reminder process be terminated (step 228). Such a request could be made via a spoken voice command received by a digital assistant with system 100. For example, DAC 102 can be programmed to respond to a user saying "Terminate the reminder associated with the oven" by ending the reminder process initiated by the command "Preheat oven to 375°". A termination request could also be entered by a user via user interface 110. In response to the receipt of such a request, processor 104 would terminate the reminder process (steps 228 and 222). Thus, embodiments can include prohibiting the generation of the audible reminder signal in response to the recognition of the received representation of a request to prevent the generation of an audible reminder signal. If no such request was sensed by the processor in step 228, the process continues with step 214. If the reinitiated reminder interval has elapsed, an additional reminder instruction is transmitted to at least one identified digital assistant (steps 216 and 218), and an audible signal is generated (step 220).

Figure 3:
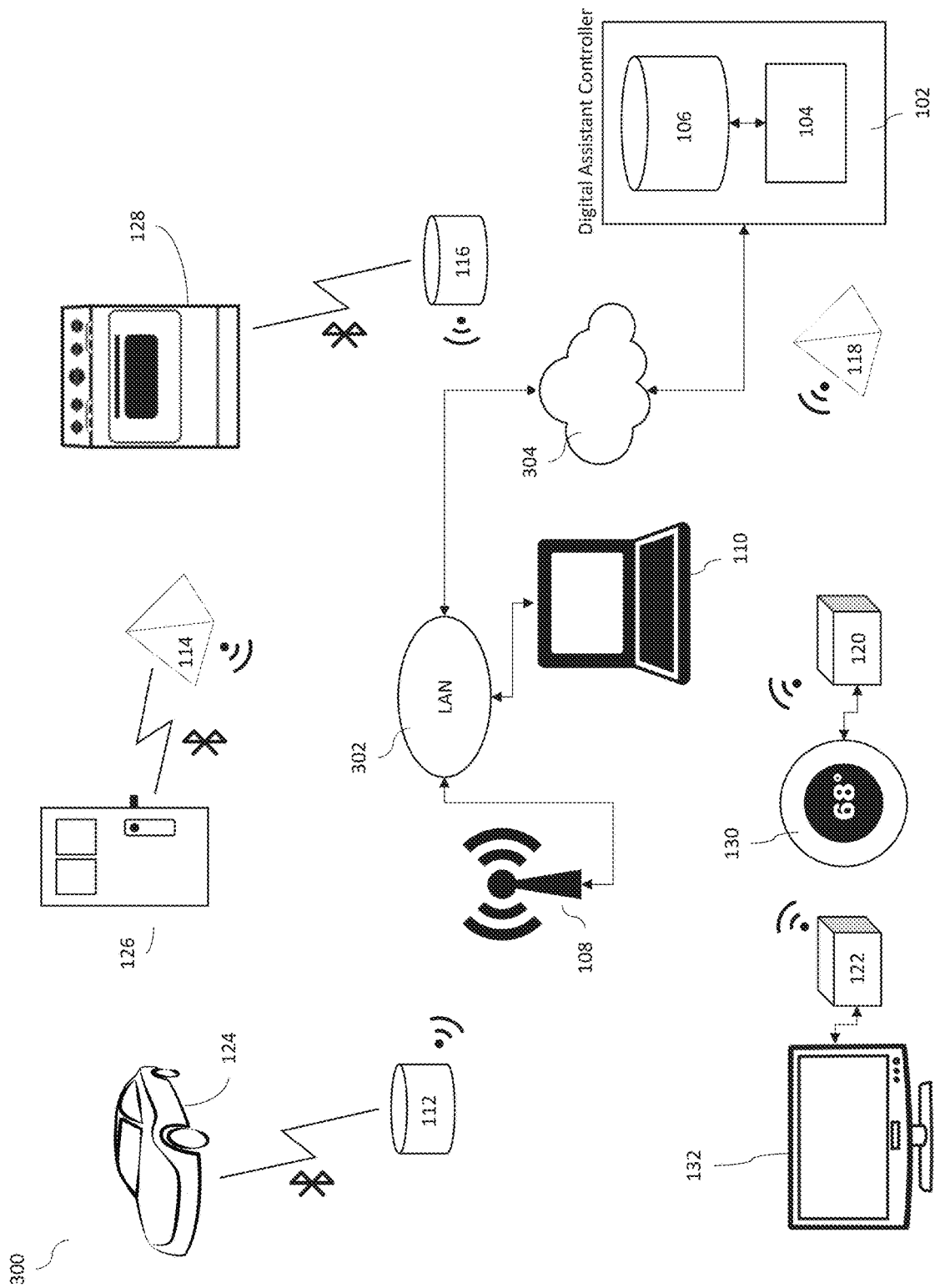
FIG. 3 is a functional diagram of an alternate preferred embodiment of a digital assistant management system.

FIG. 3 depicts an alternate embodiment of a digital assistant management system in accordance with this invention. As shown, system 300 includes many of the same components as system 100, and the operation of system 300 follows the same process flows depicted in FIGS. 2A-2C. However, unlike system 100, wireless interface 108 and graphical user interface 110 are connected (either by wire or wirelessly) to local area network ("LAN") 302. LAN 302 is then connected to DAC 102 via network 304. Network 304 can be any suitable public or private network, including the Internet. This arrangement enables DAC 102 to be remotely located from the premises in which the user and the digital assistants are located. Implementing DAC 102 remotely from the user/digital assistants would include the scenario where the functionality of DAC 102 is provided as a cloud-based service. The ability to remotely process, manage and respond to vocal commands provides an added degree of flexibility to the system. The processing and storage associated with the digital assistant management system do not have to be supported by a stand-alone appliance at user premises, nor embedded within another appliance such as a set-top box. The functionality can be fully supported from a remote location without the need for the installation of additional premises equipment, or the augmentation or re-programming of existing premises equipment.

Although the invention herein has been described with reference to particular embodiments, it is to be understood that these embodiments are merely illustrative of the principles and applications of the present invention. For example, the digital assistants can be connected to a DAC or LAN via a wired network, such as Ethernet networking technologies. In addition, various functional aspects of the invention could be implemented via physical arrangements that might have varying degrees of integration. The entirety of the disclosed invention could be implemented within a monolithic system, or disparate discrete components without departing from the spirit and scope of the present invention as defined by the appended claims.

The invention claimed is:

1. A digital assistant management system comprising:
a plurality of digital assistants connected to a network;
a controller, comprising at least one processor and at least one memory, wherein:
the memory stores information on each digital assistant of the plurality of digital assistants including device-specific control capabilities of each digital assistant and a plurality of device-related commands, wherein each device-related command of the plurality of device-related commands (i) is configured to initiate a generation of an audible reminder and (ii) is associated with a reminder interval, said reminder interval defining a predetermined amount of time after an initiating command at which a reminder is generated; and
the at least one processor is adapted to:
receive from at least one digital assistant a representation of a vocal command spoken by a user;
instruct at least one of the plurality of digital assistants to control at least one of the plurality of devices in response to the reception of the representation of the vocal command spoken by a user;
recognize the received representation of a vocal command spoken by a user as a request to execute at least one command associated with a reminder interval; and
instruct at least one of the plurality of digital assistants to generate an audible reminder signal in response to the recognition of the received representation, wherein the audible reminder is related to the particular state of the at least one of the plurality of devices.

2. The system of claim 1 wherein the at least one of the plurality of digital assistants instructed by the processor to generate an audible reminder signal is the digital assistant from which the processor received the representation of the vocal command spoken by a user.

3. The system of claim 1 wherein the at least one of the plurality of digital assistants instructed by the processor to generate an audible reminder signal is the digital assistant that last received a vocal command spoken by a user.

4. The system of claim 1 wherein the at least one of the plurality of digital assistants is connected to the controller via a wireless interface.

5. The system of claim 1 further comprising a graphical user interface.

6. The system of claim 1 wherein the processor is further adapted to:
recognize a received representation of the at least one reminder terminating vocal command associated with the control of the at least one device; and
prohibit the generation of the audible reminder signal in response to the recognition of the received representation of the at least one reminder terminating vocal command.

7. The system of claim 1 wherein the controller is further adapted to:
measure an elapsed time from the reception of the representation of a vocal command from the at least one digital assistant; and
instruct the at least one of the plurality of digital assistants to generate an audible reminder signal in response to the recognition of the received representation only if the measured elapsed time exceeds a predetermined value.

8. The system of claim 7 wherein the controller is further adapted to:
instruct the at least one of the plurality of digital assistants to generate an additional audible reminder signal in response to the recognition of the received representation if the elapsed time exceeds a second predetermined value.

9. The system of claim 1 wherein the controller is further adapted to:
recognize a received representation of a request to prevent the generation of an audible reminder signal; and
prohibit the generation of the audible reminder signal in response to the recognition of the received representation of a request to prevent the generation of an audible reminder signal.

10. The system of claim 9 wherein the received representation of a request to prevent the generation of an audible signal was initiated by a vocal command spoken by a user.

11. The system of claim 9 wherein the received representation of a request to prevent the generation of an audible signal was initiated by an input to a user interface.

12. The system of claim 1 wherein at least one of the plurality of digital assistants interface with the controller via a network.

13. The system of claim 12 wherein the network comprises the Internet.

14. A method for managing a system of a plurality of digital assistants connected to a network, comprising the steps:
storing, in a memory, information on each digital assistant of the plurality of digital assistants including device-specific control capabilities of each digital assistant and a plurality of device-related commands, wherein each device-related command of the plurality of device-related commands (i) is configured to initiate a generation of an audible reminder and (ii) is associated with a reminder interval, said reminder interval defining a predetermined amount of time after an initiating command at which a reminder is generated;
receiving from at least one digital assistant a representation of a vocal command spoken by a user;
instructing at least one of the plurality of digital assistants to control at least one of a plurality of devices in response to the reception of the representation of the vocal command spoken by a user;
recognizing the received representation of a vocal command spoken by a user as a request to execute at least one command associated with a reminder interval; and
instructing at least one of the plurality of digital assistants to generate an audible reminder signal in response to the recognition of the received representation, wherein the audible reminder is related to the particular state of the at least of the plurality of devices.

15. The method of claim 14 wherein the at least one of the plurality of digital assistants instructed to generate an audible reminder signal is the digital assistant from which transmitted the representation of the vocal command spoken by a user was received.

16. The method of claim 14 wherein the at least one of the plurality of digital assistants instructed by the processor to generate an audible reminder signal is the digital assistant that last received a vocal command spoken by a user.

17. The method of claim 14 further comprising the steps of:
recognizing a received representation of the at least one reminder terminating vocal command associated with the control of the at least one device; and
prohibiting the generation of the audible reminder signal in response to the recognition of the received representation of the at least one reminder terminating vocal command.

18. The method of claim 14 further comprising the step of:
measuring an elapsed time from the reception of the representation of a vocal command from the at least one digital assistant; and
instructing the at least one of the plurality of digital assistants to generate an audible reminder signal in response to the recognition of the received representation only if the measures elapsed time exceeds a predetermined value.

19. The method of claim 18 further comprising the step of:
instructing the at least one of the plurality of digital assistants to generate an additional audible reminder signal in response to the recognition of the received representation if the measures elapsed time exceeds a second predetermined value.

20. The method of claim 14 further comprising the step of:
recognizing a received representation of a request to prevent the generation of an audible reminder signal; and
prohibiting the generation of the audible reminder signal in response to the recognition of the received representation of a request to prevent the generation of an audible reminder signal.

21. The method of claim 14 wherein the received representation of a request to prevent the generation of an audible signal was initiated by a vocal command spoken by a user.

22. The method of claim 14 wherein the received representation of a request to prevent the generation of an audible signal was initiated by an input to a user interface.

\* \* \* \* \*